Dec. 6, 1960 C. E. DAVIS 2,963,352
PACKAGED IMPREGNATED CHARCOAL FUEL PRODUCT
Filed Nov. 5, 1956

INVENTOR
CLAUDE E. DAVIS
BY
*Mason Graham*

ATTORNEYS

United States Patent Office 2,963,352
Patented Dec. 6, 1960

2,963,352

PACKAGED IMPREGNATED CHARCOAL FUEL PRODUCT

Claude E. Davis, 120 S. Pritchard Ave., Fullerton, Calif.

Filed Nov. 5, 1956, Ser. No. 620,440

1 Claim. (Cl. 44—40)

My invention has to do with a new article of manufacture, namely, a sealed package of charcoal particles impregnated with a relatively more inflammable material. This application is a continuation in part of my application Serial No. 361,030, filed June 11, 1953, now abandoned.

Home and outdoor charcoal broiling of meats has long been very popular but those who have indulged in it have always experienced considerable difficulty in initially igniting and bringing the charcoal to red heat. Prior to the introduction of the product of my said prior application of which this is a continuation in part, many different expedients were used but none with any appreciable degree of satisfaction. For instance, the most commonly used expedient is first to build a wood fire and place the charcoal upon it, but not only does this expedient require considerable time but it leaves objectionable ashes which become deposited by drafts upon the meat being broiled, and quite frequently the wood fire exhausts itself before the charcoal becomes fully ignited.

Another expedient has been to pour some hydrocarbon distillate, such as kerosene, upon the charcoal, but this produces objectionable smoke odors and flavors, frequently burns out before the charcoal becomes ignited, and it is dangerous in that frequently accidental burns result from it use.

Another expedient has been to intermix wax-like pellets with the charcoal but this expedient creates objectionable smoke and since the pellets usually become covered by the charcoal, they are so sealed from atmosphere as to prevent combustion.

Various other so-called igniters have also been proposed, but with little success. For instance, various mixtures of combustibles, such as powdered lignite coal, ground corn cobs, alcohol, benzol, wax binders, powdered charcoal, peat dust, sawdust, and even scrap rubber have been compressed into cakes or briquets or compressed into containers. Such expedients, however, have not been either successful or desirable because they will not withstand heat while stored in sealed containers and because of the objectionable smoke and odors produced. Also, so-called canned heats including combustible jellies and saturated waste have been proposed for the purpose but for the same reasons have had little or no success.

Moreover, all those products at best provide nothing more than igniters, and are incapable of functioning in themselves as a self-igniting charcoal fuel for carrying out a broiling operation. That is, they may be capable of being used to heat a cooking utensil but they are entirely unsuitable for broiling purposes where the meat is exposed directly to the heat or flame.

Any attempt to provide a prepared, sealed, self-igniting charcoal product capable of being used as the sole fuel for a meat broiling operation, presents many problems. For instance, one of the principal problems is that, to be commercially feasible, such a product must be capable of being stored, often for long periods of time, in heated warehouses while awaiting distribution to the trade and therefore the packaged product must be capable of withstanding high temperatures for considerable periods of time as otherwise they present such hazards of fire and explosion that city ordinances would not permit their use.

In my said prior application I have disclosed a prepared, sealed package of alcohol-impregnated charcoal particles wherein the particles are irregularly shaped and loosely packed so as to provide therebetween expansion spaces for the gases resulting from volatilization of the impregnating agent. This product has gone a long way toward filling this long-existing need for a packaged, self-igniting charcoal fuel capable of serving as the sole fuel for a broiling operation rather than merely as an igniter for the fuel to be used in the broiling operation. However, I have discovered that even the product of my said prior application can be surprisingly improved by utilizing irregularly shaped charcoal particles which meet critical dimensional requirements. That is, I have found that by providing irregularly shaped charcoal particles which have minor dimensions of not less than ½", the impregnating agent penetrates the particles to substantial depth and therefore produce a flame for a longer period of time to insure that the charcoal particles are brought to red heat before the impregnating agent is exhausted. Also, such minimum dimensions insure larger expansion spaces between contiguous particles and provide for better circulation of air through the bed of charcoal particles to facilitate combustion, as well as other important advantages such as maximum surface area and insuring that the charcoal particles in the sealed container will not become caked and bonded to prevent ready removal from a container.

While the major dimensions of the individual charcoal particles are not as critical as the minor dimensions, I find that, if the particles have major dimensions not exceeding 4", the ideal number of particles may be carried in a given sized container while still providing adequate expansion space and permitting the particles to be freely poured from the package when ready for use.

Those improved features therefore not only produce a product which is capable of being stored in heated warehouses for a long period of time without danger of fire and explosion but which also functions with surprisingly greater efficiency in use.

It is therefore an object of my invention to provide a sealed package of impregnated charcoal particles capable of being used as a sole fuel for a complete charcoal broiling operation rather than merely as a means for igniting another fuel, and which package is capable of being stored under high temperatures for long periods of time without danger of fire or explosion and without losing its effectiveness as a quickly ignitable fuel.

It is also a more particular object of my invention to provide a sealed package containing loosely packed, irregularly shaped charcoal particles preimpregnated with a relatively more quickly inflammable volatile liquid and in which the charcoal particles have critical minor dimensions.

Another object of my invention is to provide a novel fuel package peculiarly suited for use in camping and beach parties.

While I shall point out in the appended claim those features which I believe to be new, I shall explain my invention by describing in detail presently preferred embodiments thereof, for which purpose I shall refer to the accompanying drawing wherein, Fig. 1 is a view partly in side elevation and partly in section showing my new packaged fuel product;

Figure 1:
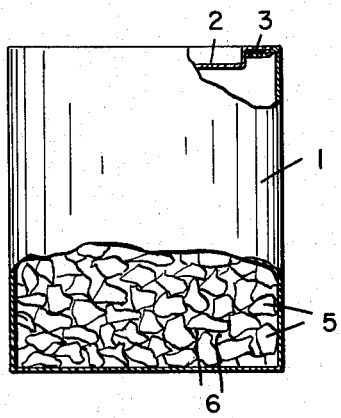

Referring now to the drawing, I show, in Fig. 1, a conventional metal container or can 1 hermetically sealed by a cover lid 2, and containing charcoal particles 5.

The charcoal particles, before being sealed in the container, are fully impregnated with a relatively more quickly inflammable, volatile liquid such, for instance, as isopropyl alcohol. To so impregnate the charcoal particles I first place a large supply of the particles in a relatively large tank, not shown, and pour the impregnating liquid over them and allow them to remain in the tank until the particles have absorbed the liquid, enough of the liquid being employed to insure that the particles become fully saturated. For instance, for each pound of charcoal particles I use one-tenth of a pint of impregnating liquid. Preferably air should be exhausted from the container before sealing.

Inasmuch as the volatile inflammable liquid produces expansible gases, particularly when the filled can is stored in a heated warehouse or the like, I make the charcoal particles irregular in shape so that expansion spaces 6 are provided between contiguous charcoal particles.

Figure 2:
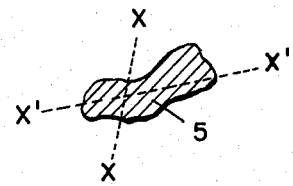
Fig. 2 is a sectional view of a typical charcoal particle used in the package.

To insure particle sizes which will afford sufficiently deep penetration of the impregnating liquid, provide ideal surface area for proper igniting, provide ample air circulation through the bed of charcoal particles when being used, to insure proper combustion and to insure adequate expansion spaces between the particles and prevent caking, I have discovered that the particles should have minor dimensions of not less than ½", as denoted by the line X—X in Fig. 2. While the major particle dimension is relatively less critical, I have discovered that a major dimension of not more than 4", as shown by the line X'—X' in Fig. 2, will insure adequate expansion spaces 6 and at the same time enable proper packaging.

While I prefer to use isopropyl alcohol as the impregnating agent, other readily inflammable volatile liquids well known in the art may be satisfactorily used. However, preferably the impregnating liquid should be one not having such a high degree of volatility as to produce explosion and fire hazards when placed in a broiler. In addition to isopropyl alcohol I have found that hexamethylenepentamine is an excellent impregnating agent.

The charcoal particles must be loosely packed so as not to become compacted and crumbled, and so as to prevent caking and bonding which would interfere with dispensing from the container and which would also reduce the expansion spaces. Ideally, the charcoal particles should fill approximately 90% of the interior cubic capacity of the container while the remainder of the capacity should consist of expansion spaces.

The can or container 1 may have a frictionally fitted cover lid 2, preferably with a ring 3 of sealing wax interposed between the lid flange and the container. Also the container may be sealed in any other suitable manner, such as by soldering. While I have found metal cans to be ideal, it is possible, particularly where the packaged product is not to be subjected to a great deal of handling before use and where it is not to be stored for unusually long periods of time in extremely hot surroundings, to use a liquid impervious paper or composition package instead of metal containers.

In use my product provides its own ignition and serves as the sole fuel for a complete broiling operation, it only being necessary to pour the desired quantity of charcoal particles from the container into a broiler and ignite them with a match. The readily inflammable impregnating agent produces instantaneous ignition and since the impregnating agent impregnates the particles to a considerable depth due to their particle size, by the time the impregnating agent has been exhausted the charcoal particles will have reached a red heat ready for cooking. No objectionable smoke or odor is produced and the use of my fuel entails no personal injury hazards.

Figure 3:
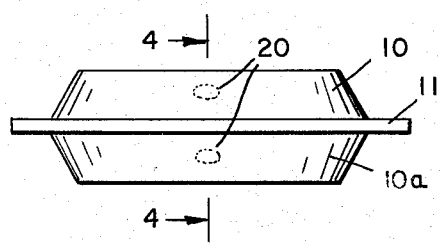
Fig. 3 is a side elevational view of a modified form of fuel package.
Figure 4:
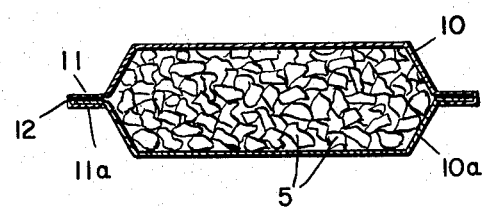
Fig. 4 is a section taken on line 4—4 of Fig. 3.

In Figs. 3 and 4 I show a modified form of fuel package which is peculiarly advantageous for use on picnics, camping and beach parties, since the container is shallow enough to serve as a container for the charcoal particles during the cooking operation. Here I show two oppositely disposed, superimposed, frusto-conical receptacles 10, 10a each having a peripheral flange 11, 11a, the flange 11a of the top receptacle being crimped about the flange 11 of the lower receptacle to provide a seal. The space between the two receptacles is filled with loosely packed charcoal particles 5a having the major and minor dimensional limitations before described and impregnated in the same manner. Thus when it is desired to use the fuel, the flange 11 may be bent out of its position about flange 11a so that the two receptacles may be separated and each receptacle then provides a container or pan for the charcoal particles during the ensuing cooking operation. In practice, I prefer to make the receptacles 10, 10a of a suitable heavy grade of aluminum foil so that it is relatively easy to bend the flange 11 from its position about flange 11a, and to insure a proper seal I prefer to place a ring 12 of wax between the flanges.

Figure 5:
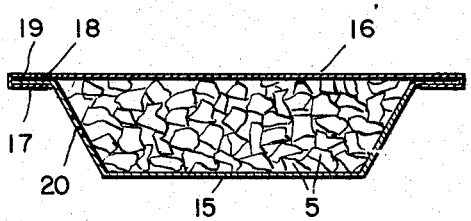
Fig. 5 is a sectional view of another modified form of my product.

In Fig. 5 I show a further variational form of package in which I provide only one frusto-conical receptacle 15 to which I attach a flat cover plate 16 whose outer edge portion 17 is crimped about the peripheral flange 18 of the receptacle. A wax ring 19 is interposed between the flange 18 and the cover. This receptacle as well as the cover plate 16 are also preferably made of a suitable grade of aluminum foil.

In using the package of Figs. 3 and 4 or the package of Fig. 5 as a container for the fuel during burning, I prefer to punch holes in the side walls of the receptacles as indicated by the broken lines 20 to permit air circulation through the bed of charcoal particles.

I claim:

As a new article of manufacture, a charcoal fuel package characterized by having the ability to withstand storage under the conditions of high temperature without producing fire and explosion hazards and whose fuel is capable of being instantly ignited, quickly brought to a red heat and used as the sole fuel for a complete charcoal meat broiling operation without producing excessive smoke or objectionable odors, comprising an hermetically sealed metallic container containing loosely packed charcoal bodies each saturated with isopropyl alcohol and presenting contiguous surfaces portions of which contact each other and portions of which are sufficiently non-parallel to leave spaces therebetween for expansion of gases produced by volatilization of said liquid during storage.

References Cited in the file of this patent

UNITED STATES PATENTS

| | | |
|---|---|---|
| 2,170,326 | Headland | Aug. 22, 1939 |
| 2,206,362 | Mulcey | July 2, 1940 |
| 2,738,260 | Wolfson et al. | Mar. 13, 1956 |
| 2,816,013 | Powell | Dec. 10, 1957 |
| 2,854,321 | Stanton | Sept. 30, 1958 |